No. 871,302. PATENTED NOV. 19, 1907.
W. C. SECKLER.
MULTIPLYING BACK FOR CAMERAS.
APPLICATION FILED MAR. 9, 1907.
2 SHEETS—SHEET 1.
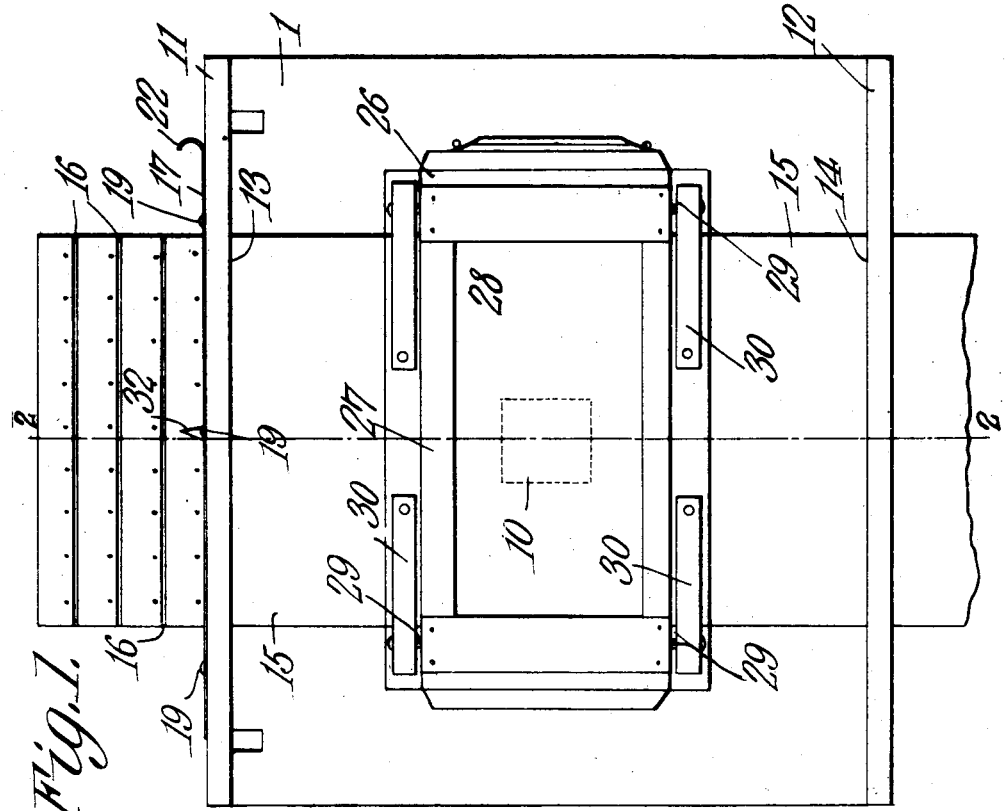
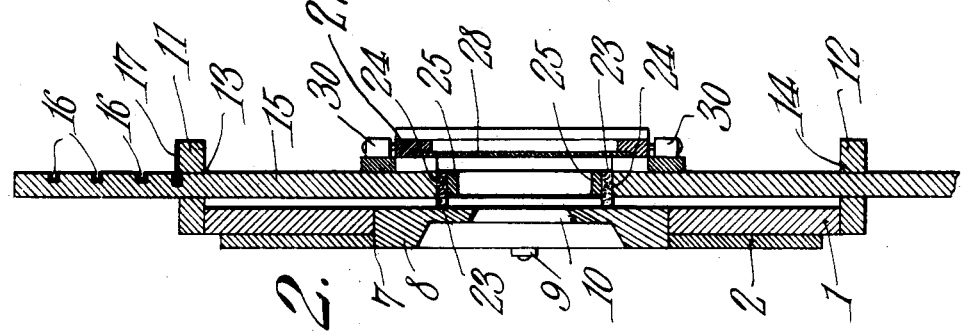
WITNESSES:
Winfield C. Seckler,
INVENTOR.
By C. A. Snow & Co.
ATTORNEYS No. 871,302. PATENTED NOV. 19, 1907.
W. C. SECKLER.
MULTIPLYING BACK FOR CAMERAS.
APPLICATION FILED MAR. 9, 1907.
2 SHEETS—SHEET 2.
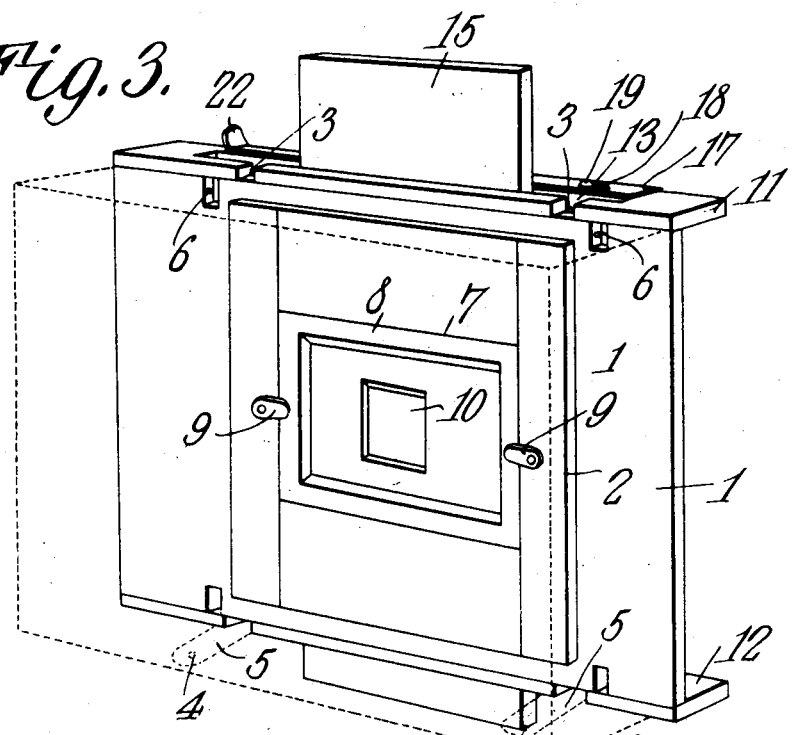
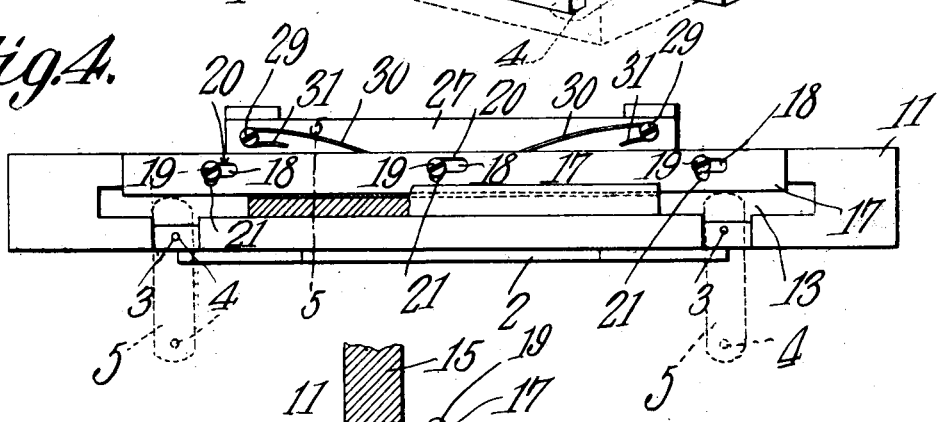
WITNESSES:
E. F. Stewart
C. A. Bateman
Winfield C. Seckler,
INVENTOR.
By C. A. Snow & Co.
ATTORNEYS
THE NORRIS PETERS CO., WASHINGTON, D. C.

UNITED STATES PATENT OFFICE.

WINFIELD C. SECKLER, OF MARIANNA, ARKANSAS.

MULTIPLYING-BACK FOR CAMERAS.

No. 871,302.  Specification of Letters Patent.  Patented Nov. 19, 1907.

Application filed March 9, 1907. Serial No. 361,509.

*To all whom it may concern:*

Be it known that I, WINFIELD C. SECKLER, a citizen of the United States, residing at Marianna, in the county of Lee and State of Arkansas, have invented a new and useful Multiplying-Back for Cameras, of which the following is a specification.

The present invention relates to improvements in photographing apparatus, and it has for its object to provide a multiplying attachment adapted for application to an ordinary camera whereby the latter will be capable of effecting a plurality of exposures suitably positioned upon a single sheet of sensitized material, enabling a number of small pictures to be obtained by a series of exposures without the necessity of inserting sensitized material for each exposure, and exposures made in this way may be developed and printed with the greatest facility and economy and, furthermore, it has for its object to provide a device of this character that may be reversibly attached to a small or hand camera in lieu of the usual focusing screen thereof.

To these and other ends, the invention consists in certain improvements and combinations and arrangements of parts, as will be hereinafter fully described, the novel features being pointed out particularly in the claims at the end of the specification.

In the accompanying drawings:—Figure 1 is an elevation of a multiplying attachment constructed in accordance with my present invention. Fig. 2 represents a vertical section thereof on the line 2—2 of Fig. 1. Fig. 3 is a perspective view of the attachment viewed from the rear, a portion of the camera box being shown in dotted lines. Fig. 4 is a plan view of the attachment. Fig. 5 represents a fragmentary section on line 5—5 of Fig. 4.

Corresponding parts in the several figures are indicated throughout by similar characters of reference.

A multiplying attachment constructed in accordance with my present invention embodies generally a frame or support adapted to fit the ordinary camera and provide a back therefor, the frame being provided with suitable devices so arranged as to coöperate with the usual springs or catches employed on the ordinary hand or view cameras for holding the focusing screen in operative position, the attachment being interchanged for the focusing screen, and on this frame is mounted a slide which is arranged to operate in a plane parallel to the focal plane of the camera lens and to move in both a vertical and a horizontal direction, the slide carrying a suitable holder for the sensitized material and being also preferably provided with a focusing screen in order that the views may be properly focused and positioned on the sensitized material.

In the present embodiment of the invention, the frame 1 is provided with an embossed portion 2 of a dimension corresponding to that of the inside of the camera box, and the edges of this embossed portion coöperate with the camera back to position the frame thereon and provide a light tight joint, the frame thus fitted to the camera box forming a back therefor.

Any suitable means may be employed for attaching the frame to the camera, the devices employed in the present instance being adapted to coöperate with the catches employed on the ordinary hand or view cameras for detachably holding the focusing screen in position and embodying a set of pins or projections 3 arranged to coöperate with the apertures 4 in the free ends of the spring catches 5, a set of four of the latter being usually provided upon the camera for the purpose of holding the usual ground glass thereon, and in order to enable the attachment to be reversed relatively to the camera, it is preferable to provide a second set of projections 6 extending at right angles to those first described and adapted to coöperate with the catches 5 when the attachment is given a quarter turn and then applied to the rear of the camera box, and this will enable the views to be arranged either lengthwise or crosswise of the longer dimension for the negative.

The center of the embossed portion 2 is provided with an aperture 7 preferably of a size corresponding to the size of the largest negative the attachment is capable of receiving, and into this aperature are detachably fitted the reducing frames 8 held in position by buttons or other suitable devices 9 and each having an exposure opening 10 of a size equal to the size of the picture desired. It is generally preferable that the exposure openings employed should be of a size that is equally divisible into the dimension of the sensitized material that is to receive the exposures, the frames 8 being interchangeable for this purpose.

At the top and bottom of the frame or support are provided a pair of parallel guides 11 and 12 having longitudinally extending guideways 13 and 14, and mounted to operate in these guideways is a carrier or slide 15, the latter being capable of movement in a plane parallel to the focal plane of the camera lens and movable in a direction longitudinally and also transversely of the guides 11 and 12.

In order to guide the slide while moving in a direction longitudinally of the guides, the slide is preferably provided with a set of grooves 16 spaced according to the number of rows of views that it may be desirable to produce on the negative, and coöperating with the appropriate groove is a locking bar 17 mounted on the upper side of the guide 11 and having slots 18 therein adapted to coöperate with screws or projections 19 on the guide 11, the slots having each a straight portion 20 adapted to receive the projections when the bar is locked in coöperative relation with one of the grooves 16 and having a laterally turned portion 21 adapted to receive the projection when the bar is reciprocated in one direction, entrance of the projections into these laterally turned portions of the slots permitting disengagement of the locking bar relatively to the grooves, and thus permitting the slide to be adjusted in a direction transversely of its grooves, so that the locking bar will coöperate with any groove of the set, as may be desired. The locking bar may be conveniently operated manually by manipulation of the handle 22 thereon.

In order to prevent the entrance of light between the slide and its support, it is preferable to provide a suitable light excluding device, the latter embodying, in the present instance, a ring of felt 23 fitting the walls of an aperture 24 formed in the slide and of a size preferably corresponding to the opening in the plate holder or other receptacle for the sensitized material, and this ring of felt is held in place by a retaining ring 25 fitting within it.

The attachment is adapted, of course, to receive sensitized material in the form of the usual glass plates or in the form of the well known flexible film, and in the present instance I have, for convenience, shown the attachment as adapted to an ordinary plate holder 26, the latter being arranged to fit flatwise against the rear surface of the slide and coöperate with the rear edge of the felt ring 23 to exclude light from the plate when the usual curtain slide is withdrawn.

The plate holder is held in coöperative relation with the slide by means of a spring operated member, the latter, in the present instance, being fitted with a ground glass in order that it may serve as a focusing screen when the plate holder is removed, and this member embodies, in the present instance, a frame 27 fitted with a ground glass 28 and adapted to receive the plate holder between it and the slide, the frame 27 being provided with a set of outwardly extending projections 29 adapted to coöperate with correspondingly arranged springs 30, the latter, in the present instance, being in the form of leaf springs attached at their inner ends to the slide at each side of the space to receive the plate holder and having looped portions 31 at their ends to receive the projections 29 on the frame 27. The action of these springs normally tends to move the frame 27 toward the slide with a yielding pressure, so that when the plate holder is interposed between the parts it will be firmly supported in proper relation to the camera lens, and when the plate holder is removed, the ground glass will automatically assume the position previously occupied by the plate in the plate holder by reason of the movement of the frame 27 toward the slide under the action of its springs 30; that is to say, when a plate holder is in position, the ground glass frame will operate to retain it in the focal plane of the camera lens, and when the plate holder is removed, the ground glass frame will automatically move into the focal plane of the lens, so that the image when properly focused on the ground glass will be also focused properly relatively to the plate in the plate holder when the latter is applied to the slide.

The camera attachment constructed in accordance with the present invention may be readily adjusted and operated to effect any desired number of exposures on a single plate; assuming that it is desirable to take thirty-two pictures on the single plate, the locking bar 17 is reciprocated until the projections 19 rest in the laterally turned portions of its slots, the bar then being withdrawn from the grooves 16 so that the slide may be adjusted until the opening 10 occupies one thirty-second of the plate at one of its corners, an appropriate reducing frame having been previously inserted into the opening 7 having an exposure opening 10 having a height equivalent to, say, one-fourth of the width of the plate, and a width of, say, one-eighth of the length of the plate. When the appropriate groove 16 has been selected, the bar 17 is moved into locked position and the slide is shifted successively a series of steps or intervals equivalent each to one-eighth of the length of the plate in a direction longitudinally of the guides 11, 12, an exposure being produced at each step. This will produce a row of eight exposures arranged in a direction lengthwise of the plate and covering a strip thereof equivalent to one-fourth of its area measured transversely. The next row of exposures is provided for by unlocking the bar 17, as previously described, and shifting the slide in a direction transversely of the guides 11 and 12 until the locking bar 17 registers with the appropriate groove 16 that will cause the slide to operate in a path while the reduced exposure opening 10 occupies a position close toward the center of the plate, and as the slide is shifted step by step in a direction longitudinally of the guides, a second row of light exposures will be produced, and a third row of exposures may be produced after the slide has been so adjusted that the appropriate groove registers with the locking bar 17.

Of course, it will be understood that the above is merely an example illustrating generally how a plurality of views may be obtained on a single plate, and by providing a sufficient number of grooves 16 and employing a set of interchangeable reducing frames having suitably sized apertures, almost any desired number of views may be obtained on a plate, from a full sized view, which is obtainable by omitting the reducing frame 8 to, say, thirty-two views, which has been found practicable in using a five inch by seven inch plate, and, of course, if desired, the number of views may be further multiplied, it merely being necessary to provide additional grooves 16 for guiding the slide and shifting the plate holder a shorter distance at each step between the exposures.

In order to facilitate the shifting of the plate holder at each step for the successive exposures, it is preferable to provide the slide with an appropriate scale for indicating the positions that the plate holder should occupy at each step in producing a row of exposures, and such a scale is shown in the present instance, a pointer 32 on the guide 11 coöperating with the scale to indicate the proper position for the plate holder at each exposure.

A plate holder constructed in accordance with my present invention is especially adapted for use in connection with the small hand or views cameras, as distinguished from those used in studios, and the attaching devices enable the device to be readily applied to the ordinary cameras without modification, employing the devices now used as an attachment for the usual focusing screen, and the novel arrangement of the attaching devices on the attachment enable the latter to be so applied to the camera that the views may be arranged either lengthwise or crosswise on the negative. Moreover, the attachment is very narrow measured from front to rear, and this facilitates its packing and enables it to be fitted into a case of very small dimensions, and danger of injury is minimized, while the simple construction of the device enables it to be constructed at small cost.

What is claimed is:—

1. In a multiplying attachment for cameras, the combination with a suitable support adapted to be attached to a camera back and having guideways thereon, of a slide for the sensitized medium mounted to operate longitudinally of said guideways and adjustable in a direction transversely thereto, and a device for maintaining the slide in given angular relation to the guideways when the slide is in different positions of adjustment transversely of said guideways, and for locking the slide in different positions of adjustment transversely of the guideways.

2. In a multiplying back for cameras, the combination with a suitable support adapted to be attached to a camera and having guideways thereon, of a slide for the sensitized material mounted to operate longitudinally of said guideways and capable of adjustment in a direction transversely thereto, and a retaining device coöperating with the said slide for guiding the latter in different paths arranged parallel to the guideways and capable of maintaining the slide in a given angular relation to the guideways, and means for locking the said device in coöperative relation to the slide.

3. In a multiplying back for cameras, the combination with a suitable support adapted to be attached to a camera, of a slide for the sensitized medium having a series of guiding portions arranged in parallelism, and a device on the support of a length approximately equal to the range of movement of the slide and adapted to coöperate with said guiding portions for insuring movement of the slide in a series of paths arranged in parallel relation and serving to maintain the slides in a given angular relation to the path of movement.

4. In a multiplying attachment for cameras, the combination with a suitable support adapted to be attached to a camera and having guideways thereon, of a slide for the sensitized medium mounted to operate longitudinally of said guideways and having a series of guiding grooves extending parallel to the guideways and suitably spaced transversely thereof, a bar coöperating with said grooves for guiding the slide in a plurality of paths arranged in parallel relation and means for locking said bar in coöperative relation with one of said grooves.

5. In a multiplying attachment for cameras, the combination with a suitable support adapted to be attached to a camera and having guideways thereon, of a slide adapted to carry a sensitized medium mounted to operate longitudinally of the guideways and having a series of suitably spaced guiding grooves formed thereon, and a locking member having devices for locking it in and out of coöperative relation with said grooves for guiding the slide in different paths extending parallel to the guideways.

6. In a multiplying attachment for cameras, the combination with a suitable support adapted to be attached to a camera and having guideways thereon, and a reducing frame fitted into said support having a reduced exposure opening therein, of a slide for the sensitized medium guided to operate longitudinally of the guideways and capable of being adjusted in a direction transversely thereto, and a device movable transversely to the plane of movement of the slide and of a length approximately equal to the range of movement thereof for guiding the slide in a series of paths extending parallel to the guideways.

7. In an attachment for cameras, the combination of a part adapted to receive a plate holder, a focusing screen adapted to engage in rear of the plate holder and retain the latter in coöperative relation with the slide, said screen having a set of projections thereon, and a set of springs each attached at one end to a portion of the slide and having looped ends to coöperate with the projections on the focusing screen and normally operating to move the screen toward the slide.

8. In a multiplying attachment for cameras, the combination with a support adapted to be attached to a camera, and a pair of horizontally extending guideways arranged at the top and bottom of the support, of a slide adapted to carry the sensitized medium and capable of movement longitudinally and transversely of the guideways, and a guiding device mounted to reciprocate in a direction parallel to the guideways and movable transversely of the plane of movement of the slide and coöperating with the latter to guide it in a direction longitudinally of the guideway and retain it in different positions of adjustment transversely thereof, and means for locking said bar in coöperative relation with the slide.

9. In a multiplying attachment for cameras, the combination with a support adapted to be attached to a camera, and a pair of horizontally extending guideways arranged at the top and bottom of the support, of a slide adapted to carry the sensitized medium and capable of movement longitudinally and transversely of the guideways and having a series of suitably spaced parallel guiding grooves thereon, a bar of a length approximately equal to the range of movement of the slide longitudinally of the guideways and movable laterally into and out of engagement with the different guiding grooves on the slide, the bar having slots thereon provided with portions extending longitudinally and thence laterally of the bar, and projections on a relatively fixed part of the support and coöperating with the slots of the said bar for moving the latter into and out of the guiding grooves of the slide as the bar is reciprocated.

In testimony that I claim the foregoing as my own, I have hereto affixed my signature in the presence of two witnesses.

WINFIELD C. SECKLER.

Witnesses:
E. H. McMurry,
Larimore Robinson.